United States Patent
Aoki (10) Patent No.: US 8,374,649 B2
(45) Date of Patent: Feb. 12, 2013

(54) PORTABLE TERMINAL HAVING MOUNTED IC CHIP, APPLICATION AREA CONTROL METHOD, AND APPLICATION AREA CONTROL PROGRAM

(75) Inventor: Satoshi Aoki, Tokyo (JP)

(73) Assignee: NEC Corporation, Tokyo (JP)

( * ) Notice: Subject to any disclaimer, the term of this patent is extended or adjusted under 35 U.S.C. 154(b) by 90 days.

(21) Appl. No.: 12/920,198

(22) PCT Filed: Mar. 3, 2009

(86) PCT No.: PCT/JP2009/053927
§ 371 (c)(1),
(2), (4) Date: Aug. 30, 2010

(87) PCT Pub. No.: WO2009/110448
PCT Pub. Date: Sep. 11, 2009

(65) Prior Publication Data
US 2011/0009091 A1    Jan. 13, 2011

(30) Foreign Application Priority Data
Mar. 4, 2008   (JP) .................................. 2008-052932

(51) Int. Cl.
*H04B 1/38* (2006.01)
(52) U.S. Cl. .................... 455/558; 455/410; 379/433.09
(58) Field of Classification Search .................. 455/558, 455/410, 411, 414.1, 556.1; 379/433.09, 379/357.01, 357.02; 710/13
See application file for complete search history.

(56) References Cited

U.S. PATENT DOCUMENTS

| | | | |
|---|---|---|---|
| 8,085,891 B2 * | 12/2011 | Owen ........................... | 375/354 |
| 2004/0166874 A1 * | 8/2004 | Asokan et al. .............. | 455/456.1 |
| 2006/0112416 A1 * | 5/2006 | Ohta et al. ....................... | 726/1 |
| 2006/0273175 A1 * | 12/2006 | Ota et al. ....................... | 235/451 |
| 2007/0158403 A1 * | 7/2007 | Ertas ............................. | 235/375 |
| 2007/0189532 A1 * | 8/2007 | Onozu et al. .................. | 380/247 |
| 2008/0090549 A1 * | 4/2008 | Vialen et al. .................. | 455/405 |
| 2009/0061828 A1 * | 3/2009 | Sigmund et al. .............. | 455/413 |
| 2009/0181662 A1 * | 7/2009 | Fleischman et al. .......... | 455/419 |
| 2010/0216428 A1 * | 8/2010 | Jain et al. ...................... | 455/410 |

FOREIGN PATENT DOCUMENTS

| JP | 2000049687 A | 2/2000 |
|---|---|---|
| JP | 2003198718 A | 7/2003 |
| JP | 2004336719 A | 11/2004 |
| JP | 2005149174 A | 6/2005 |

* cited by examiner

*Primary Examiner* — Dominic E Rego (57) ABSTRACT

A portable terminal in which an application area in a contactless IC chip can be shared by a plurality of users. The portable terminal is provided with the IC chip that has a contactless communication function enabling use of a plurality of services. In addition, the portable terminal is provided with an application area information storage unit that stores application area information for associating users, application identifiers for identifying applications corresponding to services to be used, and plural application areas provided in the IC chip; and an application area control unit that puts into a useable state an application area of a user corresponding to the identification information in the IC chip, based on the application area information and the identification information for identifying the users, read from a loaded storage medium; wherein the plurality of services that use the contactless communication function can be used by each user.

10 Claims, 10 Drawing Sheets

PRE-UPDATE APPLICATION AREA INFORMATION DB

| APPLICATION AREA IDENTIFIER | APPLICATION IDENTIFIER | USAGE FLAG | SUBSCRIBER IDENTIFIER |
|---|---|---|---|
| 1 | ELECTRONIC PAYMENT SYSTEM 1 | 1 | A |
| 2 | ELECTRONIC PAYMENT SYSTEM 1 | 0 | B |
| 3 | IMMIGRATION CONTROL SYSTEM 2 | 1 | A |
| 4 | IMMIGARATION CONTROL SYSTEM 2 | 0 | C |
| 5 | — | 0 | — |

→ UPDATE APPLICATION AREA INFORMATION DB

POST-UPDATE APPLICATION AREA INFORMATION DB

| APPLICATION AREA IDENTIFIER | APPLICATION IDENTIFIER | USAGE FLAG | SUBSCRIBER IDENTIFIER |
|---|---|---|---|
| 1 | ELECTRONIC PAYMENT SYSTEM 1 | 0 | A |
| 2 | ELECTRONIC PAYMENT SYSTEM 1 | 1 | B |
| 3 | IMMIGRATION CONTROL SYSTEM 2 | 0 | A |
| 4 | IMMIGARATION CONTROL SYSTEM 2 | 0 | C |
| 5 | — | 0 | — |

| APPLICATION AREA IDENTIFIER | APPLICATION IDENTIFIER | SUBSCRIBER IDENTIFIER |
|---|---|---|
| 1 | $E_{ka}$(ELECTRONIC PAYMENT SYSTEM 1) | A |
| 2 | $E_{kb}$(ELECTRONIC PAYMENT SYSTEM 1) | B |
| 3 | $E_{ka}$(IMMIGARATION CONTROL SYSTEM 2) | A |
| 4 | $E_{kc}$(IMMIGARATION CONTROL SYSTEM 2) | C |
| 5 | — | — |

PORTABLE TERMINAL HAVING MOUNTED IC CHIP, APPLICATION AREA CONTROL METHOD, AND APPLICATION AREA CONTROL PROGRAM

REFERENCE TO RELATED APPLICATION

The present invention is the National Phase of PCT/JP2009/053927, filed Mar. 3, 2009, which is based upon and claims the benefit of the priority of Japanese Patent Application No. 2008-052932 (filed on Mar. 4, 2008), the disclosure of which is incorporated herein in its entirety by reference thereto.

TECHNICAL FIELD

The present invention relates to a portable terminal having a mounted IC chip provided with a contactless communication function, an application area control method, and an application area control program, and in particular, relates to a portable terminal having a mounted IC chip enabling use of a plurality of services using the contactless communication function, an application area control method, and an application area control program.

BACKGROUND

In recent years, application programs (referred to below as "applications") are being provided, which realize various types of service directed towards a portable terminal having a mounted IC chip provided with a contactless communication function. For example, a mechanism has been realized in which electronic money is transacted, by sending and receiving price information between a contactless IC chip and an application of an external device disposed in a store or the like, or by sending and receiving price information between a contactless IC chip and a server or the like in an external network such as a mobile telephone network or the Internet via an application in a portable terminal.

A mechanism has also been realized in which one portable terminal is shared by a plurality of users, and by replacing a detachable hardware module for identifying a subscriber, referred to as a USIM (Universal Subscriber Identity Module), in a portable terminal, it is possible to use, in a terminal, a mobile telephone service matching a mobile telephone contract of a subscriber who owns the USIM.

Patent Document 1 discloses a portable terminal that can be shared by a plurality of users by a storage Medium such as the abovementioned USIM, with a configuration such that user data (personal content) is encrypted and stored for each respective user, and privacy between each user can be protected.

Patent Document 2 discloses a portable terminal that can be shared by a plurality of users in the same way, being provided with a data storage unit in which data is logically divided into a plurality of groups to be stored, and being configured such that the groups are selected according to identifier information read from a storage medium and made to access an application program.

Non-Patent Document 1 is a document related to a service for collectively moving information on an IC chip to another portable terminal, using a backup server in a network.

[Patent Document 1] JP Patent Kokai Publication No. JP-P2004-336719A
[Patent Document 2] JP Patent Kokai Publication No. JP-P2000-49687A
[Non-Patent Document 1] NTT DoCoMo, "iC moving service", URL: http://www.nttdocomo.co.jp/service/osaifu_shopping/osaifu/ic/

SUMMARY

The entire discloses of the abovementioned Patent Documents 1 and 2 and Non-Patent Document 1 are incorporated herein by reference thereto. The following analysis is given from a viewpoint of the present invention.

A portable terminal that can be shared by a plurality of users as described above has been implemented, but usage of an IC chip by one particular person is assumed, and there is a problem in that a plurality of users cannot share various types of service that are provided using the IC chip.

Figure 3:
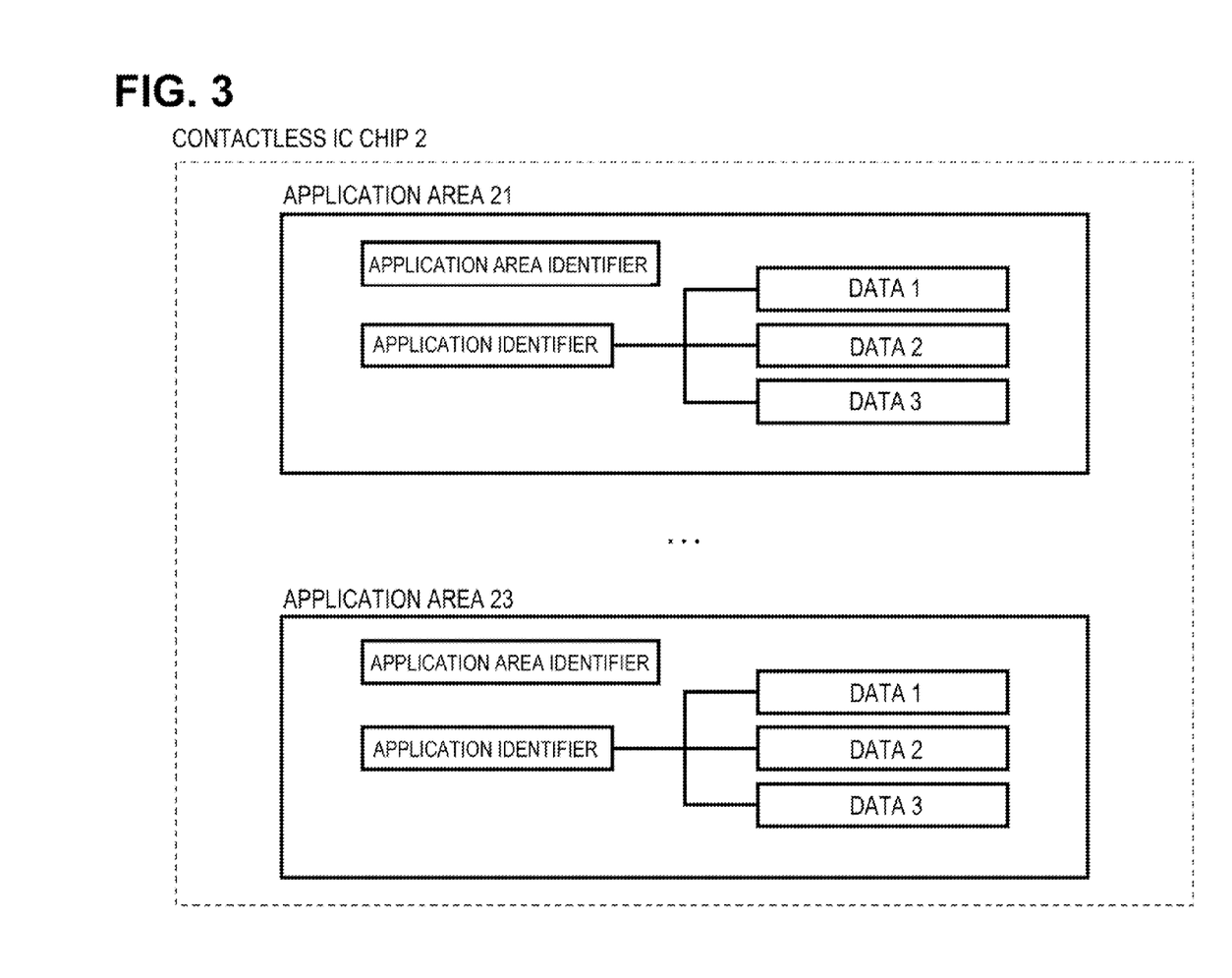
FIG. 3 is a diagram representing an outline configuration of a contactless IC chip of the portable terminal according to the first exemplary embodiment of the present invention.

A reason for this is that, as shown in FIG. 3, the configuration is such that application identifiers are stored in an application area in the IC chip provided with a contactless communication function, and to lead to an application identifier from an external device such as an IC read-writer or the like, data is read/written directly. Therefore, in a case where a user who is buying a replacement portable terminal continues to use an application, it is necessary to move the data in the IC chip, as in Non-Patent Document 1.

Technology described in Patent Documents 1 and 2 concerns a configuration in which flash memory for storing incoming and outgoing call history, telephone address book, schedule, and the like, is exclusively used by each user. If the technology described in Patent Documents 1 and 2 is applied to a storage area in an IC chip, a state may occur where the same application identifier is recorded multiple times, or a state may occur where a decryption module must be started up and left as it is. Therefore, a specification of the IC chip itself or an external device must be greatly changed.

The present invention has given consideration to the abovementioned circumstance and an object thereof is to provide a portable terminal and application area control method, in order that a plurality of users sharing one portable terminal can use a service contracted to each respective name, without greatly changing the specification of the IC chip or external device.

Thus, there is much to be desired in the art.

According to a first aspect of the present invention, there is provided a portable terminal having: an IC chip that has a contactless communication function enabling use of a plurality of services; an application area information storage unit that stores application area information for associating users, application identifiers for identifying applications corresponding to services to be used, and plural application areas provided in the IC chip; and an application area control unit that puts into a useable state an application area of a user corresponding to the identification information in the IC chip, based on the application area information and identification information read from a replaceable storage medium storing identification information for identifying users.

According to a second aspect of the present invention, there is provided an application area control method of performing control of usage of a plurality of application areas provided in an IC chip of a portable terminal in which said IC chip, having a contactless communication function, is mounted, and which enables services using said contactless communication function, the application area control method including: (first step) storing application area information for associating users, application identifiers for identifying applications corresponding to services to be used, and plural application areas provided in the IC chip, in an application area information storage unit provided in the portable terminal; and (second step), in a case where a storage medium that stores identification information for identifying users is replaced, putting into a usable state an application area of a user corresponding to the identification information in the IC chip, based on the application area information and identification information read from the storage medium. Incidentally, this method invention was tied to a particular apparatus such as the portable terminal of the first aspect.

According to a third aspect of the present invention, there is provided an application area control program (computer readable program) that performs control of usage of a plurality of application areas provided in an IC chip of a portable terminal in which said IC chip, having a contactless communication function, is mounted, and which enables services using said contactless communication function, wherein the application area control program executes, on a computer installed in the portable terminal,: a process, in a case where an application identifier is inputted from outside, of storing application area information for associating users, application identifiers for identifying applications corresponding to services to be used, and plural application areas provided in an IC chip, in an application area information storage unit provided in a portable terminal; and a process, in a case where a storage medium that stores identification information for identifying the users is replaced, of putting into a usable state an application area of a user corresponding to the identification information in the IC chip, based on the application area information and identification information read from the storage medium. It is to be noted that the application area control program can be recorded in a computer readable storage medium, and installation is possible in a portable terminal using various types of communication unit.

The meritorious effects of the present invention are summarized as follows.

According to the present invention, a plurality of users can share one portable terminal, without changing the specification of an IC chip or an external device. The reason for this is that correspondence relationships of users, applications, and application areas are stored, and based on identification information of the users, from among the plurality of application areas it is possible to put a relevant application area into a usable state.

PREFERRED MODES

Next, a detailed description is given concerning embodiments for implementing the present invention, making reference to the drawings.

Figure 10:
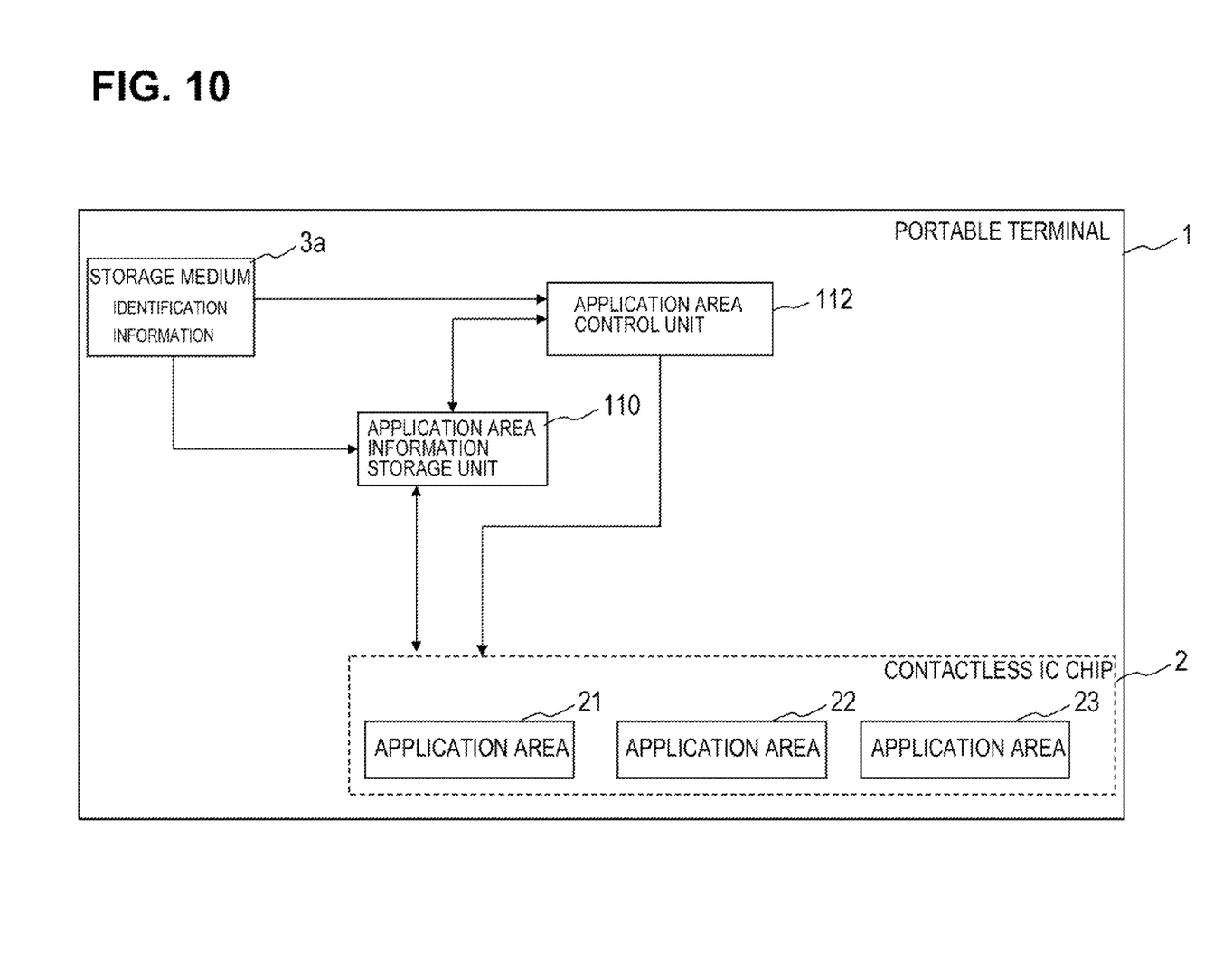
FIG. 10 is a drawing for describing an outline of the present invention.

First, a description is given of an outline of the present invention. A portable terminal of the present invention is configured to be provided with an IC chip (contactless IC chip) 2 having a contactless communication function enabling usage of a plurality of services, a replaceable storage medium 3a for storing identification information for identifying users, an application area information storage unit 110, and an application area control unit 112.

The application area information storage unit 110 stores application area information for associating users, application identifiers of applications corresponding to services to be used by using the contactless IC chip 2, and plural application areas provided in the contactless IC chip 2.

The application area control unit 112 performs control to put into a useable state an application area of a user corresponding to the identification information in the contactless IC chip 2, based on identification information read from the storage medium 3a, and application area information stored in the application area information storage unit 110.

From the above, a state is realized in which each user, who can be switched by replacement of the storage medium 3a, can receive a service by the contactless IC chip 2, by using the respective user's own application area.

First Exemplary Embodiment

Figure 1:
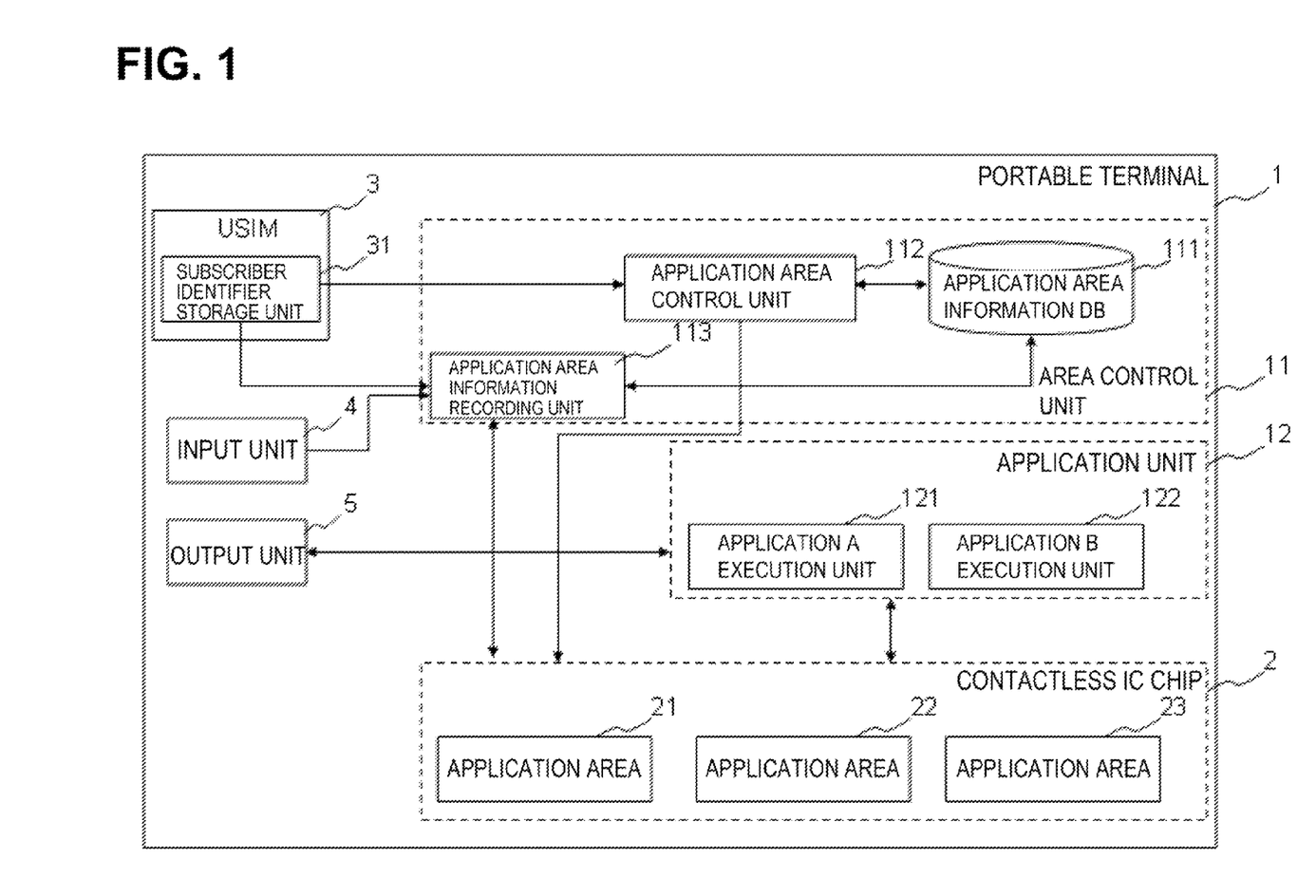
FIG. 1 is a block diagram representing a configuration of a portable terminal according to a first exemplary embodiment of the present invention.

FIG. 1 is a block diagram representing a configuration of a portable terminal according to a first exemplary embodiment of the present invention. Referring to FIG. 1, the portable terminal 1, in outline, is configured by being provided with an area control unit 11, an application unit 12, a contactless IC chip 2, an input unit 4, and an output unit 5.

The area control unit 11 is configured by including an application area information DB (database) 111, an application area control unit 112, and an application area information recording unit 113. The application area control unit 112 and the application area information recording unit 113 can be implemented by a program that makes a computer mounted in the portable terminal execute respective processes described later.

The application unit 12 performs writing and reading of data in an application area of the contactless IC chip 2, by application execution units 121 and 122, and outputs a message or the like to an output unit 5 as necessary.

The contactless IC chip 2 has a plurality of application areas 21 to 23. It is to be noted that, in an example of FIG. 1, three application areas 21 to 23 are shown, but it is possible to provide three or more application areas.

A USIM 3 is provided with a subscriber identifier storage unit 31. The subscriber identifier storage unit 31 stores a subscriber identifier and transmits the subscriber identifier in response to a request from the application area control unit 112 and the application area information recording unit 113.

The input unit 4 is configured by an information input device such as various types of button or pointing device or short-range wireless communication device, or a camera, scanner, microphone, or the like, which provides an input means to the portable terminal for a user.

The output unit 5 is configured by an information output device such as a display device, speaker, or the like, which provides a means for outputting an output result of the portable terminal to the user by a screen or the like.

Figure 2:
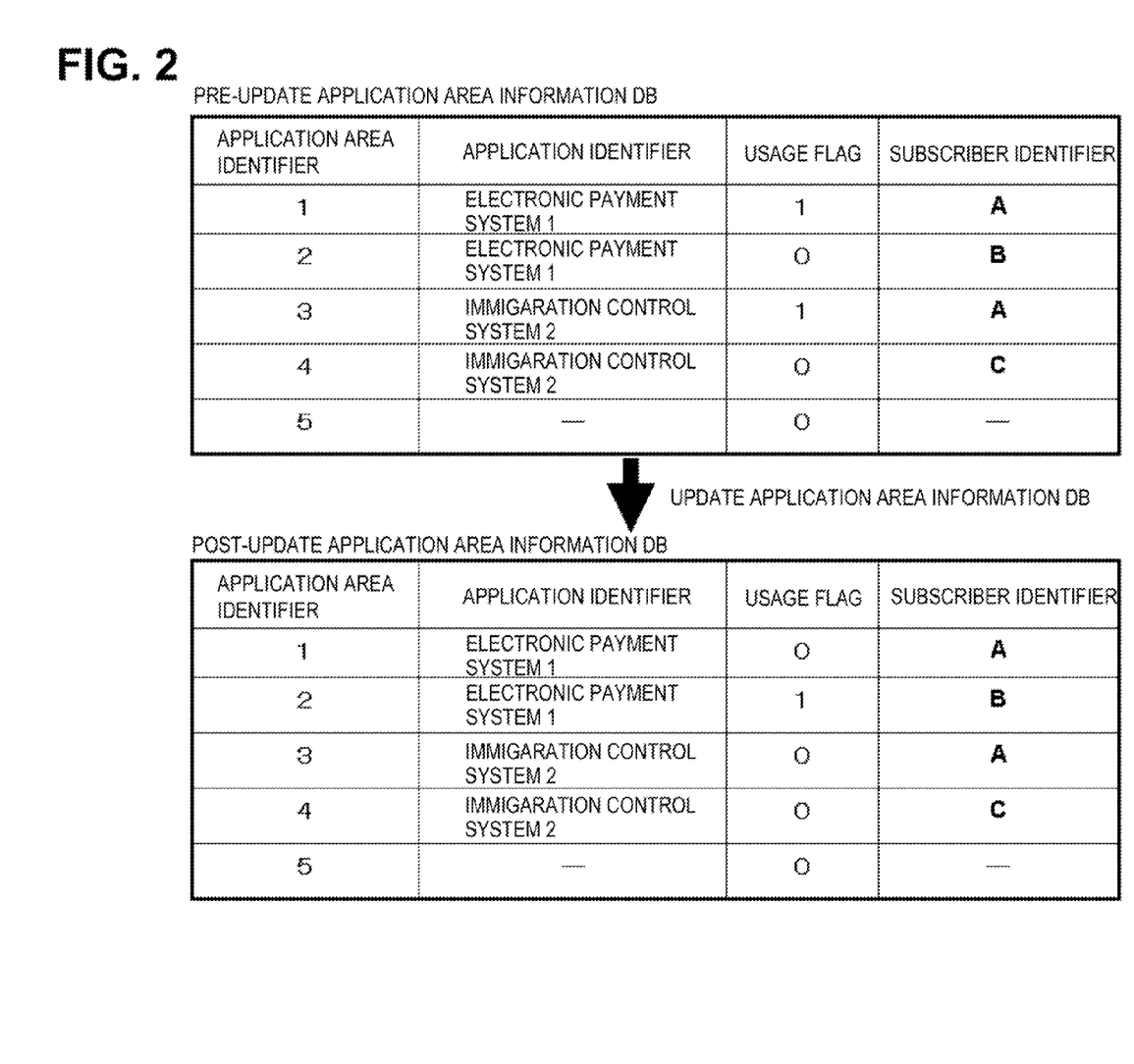
FIG. 2 is a drawing for describing an outline of a configuration and update processing of an application area information DB of the portable terminal according to the first exemplary embodiment of the present invention.

FIG. 2 is a drawing for describing an outline of a configuration of the abovementioned application area information DB 111 and update processing thereof. The application area information DB 111 stores a set (in what follows, in the present exemplary embodiment, this set is referred to as "application area information") of an application area identifier, an application identifier, a usage flag, and a subscriber identifier.

The application area control unit 112 updates the usage flag of the application area information of the application area information DB 111, based on the subscriber identifier read from the subscriber identifier storage unit 31 of the USIM 3, and also obtains the application area information after the updating.

An upper part of FIG. 2 represents the application area information in a state in which the USIM 3 of a user A who has the subscriber identifier A is installed. Here, with replacement by a USIM 3 of a user B who has the subscriber identifier B, the application area control unit 112, as shown in a lower part of FIG. 2, updates the usage flag of the application area information to which the subscriber identifier B is given, from invalid (0) to valid (1), and also the usage flag of the application area information of user A is updated to invalid (0).

The application area control unit 112 requests updating of the application identifier in the contactless IC chip 2, with regard to the contactless IC chip 2, based on the application area information that has been updated as described above. Specifically, the application area control unit 112 puts an application area for which the application area information identifier is 2 into a usable state (a state in which access from an external device is possible) from the application area information shown in the lower part of FIG. 2, and requests the contactless IC chip 2 to rewrite to a state in which other areas are not usable (a state in which access from an external device is not possible).

The application area information recording unit 113, in a case where an application identifier is inputted from the input unit 4, records in the application area information DB 111 a new entry (application area information) holding the application identifier in question, a subscriber identifier, and an unused application area identifier. Furthermore, the application area information recording unit 113, similar to the application area control unit 112, performs updating of the usage flag of the application area information and obtains the application area information after updating. In addition, the application area information recording unit 113 requests updating of the application identifier of the application area in the contactless IC chip 2, with regard to the contactless IC chip 2, based on the obtained application area information.

The application area information DB 111 and the application area information recording unit 113 correspond to the application area information recording unit.

FIG. 3 is a drawing representing a configuration of an application area of the contactless IC chip 2. The contactless IC chip 2 stores the application identifier and application data in an application area specified by the application area identifier. Furthermore, the contactless IC chip 2 performs writing and reading with respect to the application area having an application identifier corresponding to the application in question, in response to a request from the application unit 12. Furthermore, the contactless IC chip 2 updates the application identifier of the application area in response to a request to update the application identifier in the application area from the application area control unit 112 or the application area information recording unit 113.

Continuing, a detailed description is given concerning operation of the portable terminal 1 according to the present exemplary embodiment, making reference to the drawings. First, a description is given concerning operation of each part when an already recorded application is used, making reference to FIG. 4.

Figure 4:
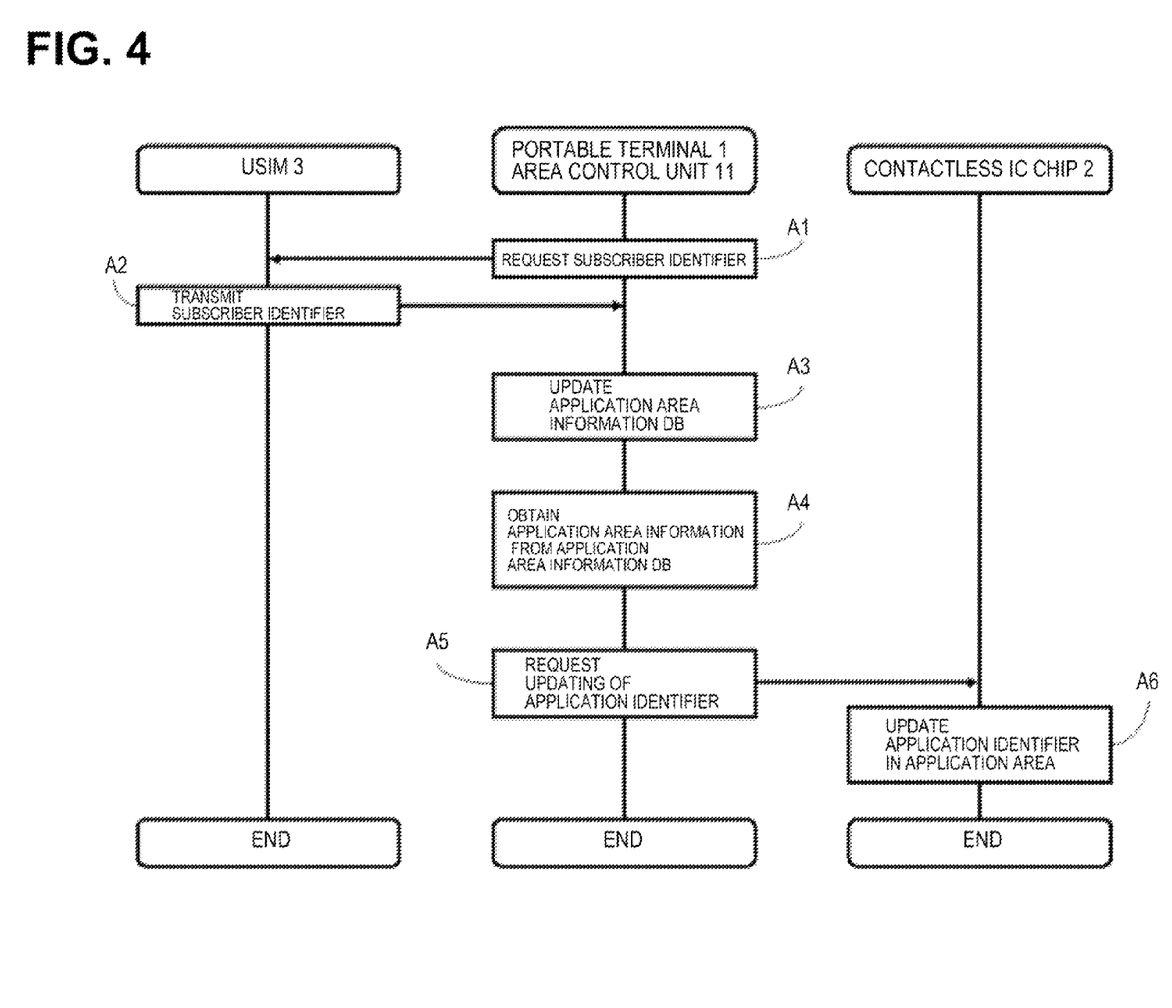
FIG. 4 is a flow diagram showing operations when a user uses an application utilizing an application area, in the portable terminal according to the first exemplary embodiment of the present invention.

When replacement of the USIM 3 is performed, the area control unit 11 of the portable terminal 1 requests a subscriber identifier from the USIM 3 (step A1).

Next, the USIM 3 transmits a subscriber identifier stored in the subscriber identifier storage unit 31 to the area control unit 11 (step A2).

The area control unit 11 that receives the subscriber identifier, among the application area information of the application area information DB 111, changes to valid (1) the usage flag of the application area information holding the received subscriber identifier, as shown in the lower part of FIG. 2, and changes to invalid (0) the usage flag of the application area information holding a subscriber identifier different from the received subscriber identifier (step A3).

Next, the area control unit 11 obtains the application area information from the application area information DB 111 (step A4).

Furthermore, the area control unit 11 transmits to the contactless IC chip 2 the application area identifier and the application identifier to the contactless IC chip 2, and requests updating of the application identifier of the application area of the contactless IC chip 2 (step A5). At this time, the area control unit 11 writes the application identifier to the application area in which the usage flag is valid (1), with regard to the contactless IC chip 2, and also makes a request that the application identifier of the application area in which the usage flag is invalid (0) be made invalid.

The contactless IC chip 2 that receives the update request writes the application identifier that has been received to the application area corresponding to the received application area identifier that has been received, and also makes invalid other application areas (step A6).

From the above result, the application identifier is written to the application area in which the usage flag has been made valid (1) using identification information read from the USIM 3, and other application areas are made invalid. Therefore, a state is realized in which each user, who can be switched according to the USIM 3, can receive a service by the contactless IC chip, by using the respective user's own application area.

Figure 5:
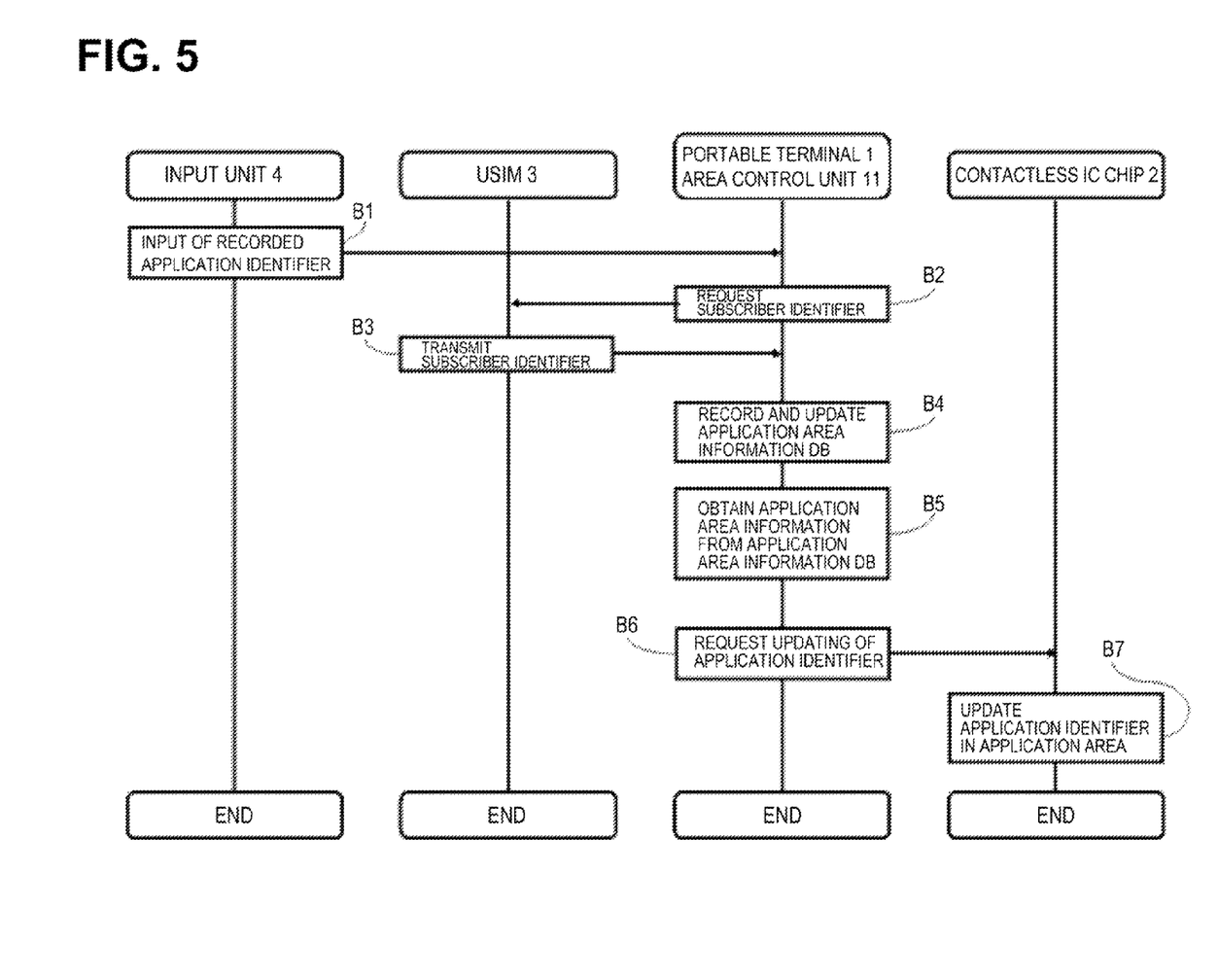
FIG. 5 is a flow diagram showing operations when a user newly uses an application, in the portable terminal according to the first exemplary embodiment of the present invention.

Next, a description is given concerning operation of each part when a user uses a new application, making reference to FIG. 5.

First, input of an application identifier recorded in the area control unit 11 of the portable terminal 1 is performed via the input unit 4 by the user (step B1).

The area control unit 11 of the portable terminal 1 requests a subscriber identifier of the USIM 3 (step B2).

Next, the USIM 3 transmits a subscriber identifier stored in the subscriber identifier storage unit 31 to the area control unit 11 (step B3).

Next, the area control unit 11 records new application area information holding a received subscriber identifier and an application identifier, in the application area information DB 111 (step B4). In addition, the area control unit 11, among the application area information of the application area information DB 111, changes to valid (1) the usage flag of the application area information holding the received subscriber identifier, as shown in the lower part of FIG. 2, and changes to invalid (0) the usage flag of the application area information holding a subscriber identifier different from the received subscriber identifier.

Next, the area control unit 11 obtains the application area information from the application area information DB 111 (step B5).

Furthermore, the area control unit 11 transmits to the contactless IC chip 2 the application area identifier and the application identifier, and requests updating of the application identifier of the application area of the contactless IC chip 2 (step B6). At this time, the area control unit 11 writes the application identifier to the application area in which the usage flag is valid (1), with regard to the contactless IC chip 2, and also makes a request that the application identifier of the application area in which the usage flag is invalid (0) be made invalid.

The contactless IC chip 2 that receives the update request writes the application identifier that has been received to the application area corresponding to the received application area identifier, and also makes other application areas invalid (step B7).

From the above result, the application identifier is written to the application area in which the usage flag has been made valid (1) using identification information read from the USIM 3, from among application areas including a newly secured application area, and other application areas are made invalid. Therefore, a state is realized in which each user, who can be switched according to the USIM 3, can receive a service by the contactless IC chip, by using the respective user's own application area.

As described above, according to the portable terminal of the present exemplary embodiment, the contactless IC chip can be shared by a plurality of users, and each user can receive the user's respective recorded service. Furthermore, since it is possible to execute necessary processing with information (application area information) in the portable terminal, there is no need to access a backup server or the like located in a network, or to change a specification of an external device such as an IC reader-writer or the like. A reason for this is that the configuration is such that by referring to the application area information, among the plurality of application areas it is possible to put an application area corresponding to a user and an application into a usable state.

Second Exemplary Embodiment

Figure 6:
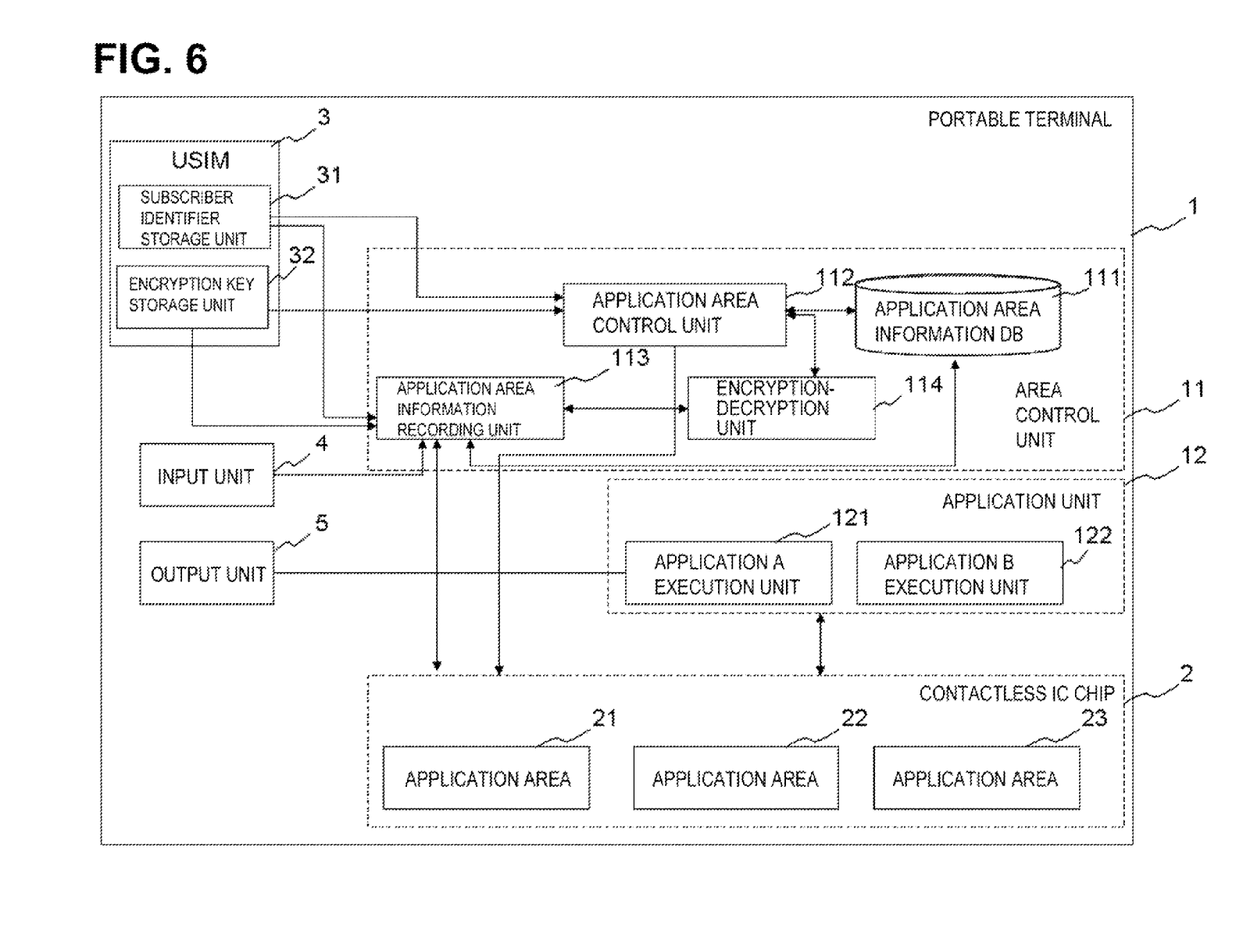
FIG. 6 is a block diagram representing a configuration of a portable terminal according to a second exemplary embodiment of the present invention.

Next, a description is given concerning a second exemplary embodiment of the present invention, in which a modification is added to the first exemplary embodiment described above. FIG. 6 is a block diagram representing a configuration of a portable terminal according to the second exemplary embodiment of the present invention. Configurational points of difference from the first exemplary embodiment represented in FIG. 1 are the point that an encryption key storage unit 32 that stores a user's unique encryption key is added to a USIM 3, and the point that an encryption-decryption unit 114 that performs encryption-decryption processing by the encryption key of the USIM 3 is added to an area control unit 11.

Below, a description is given concerning a configuration and operation of the present exemplary embodiment centered on the above described points of difference.

Figure 7:
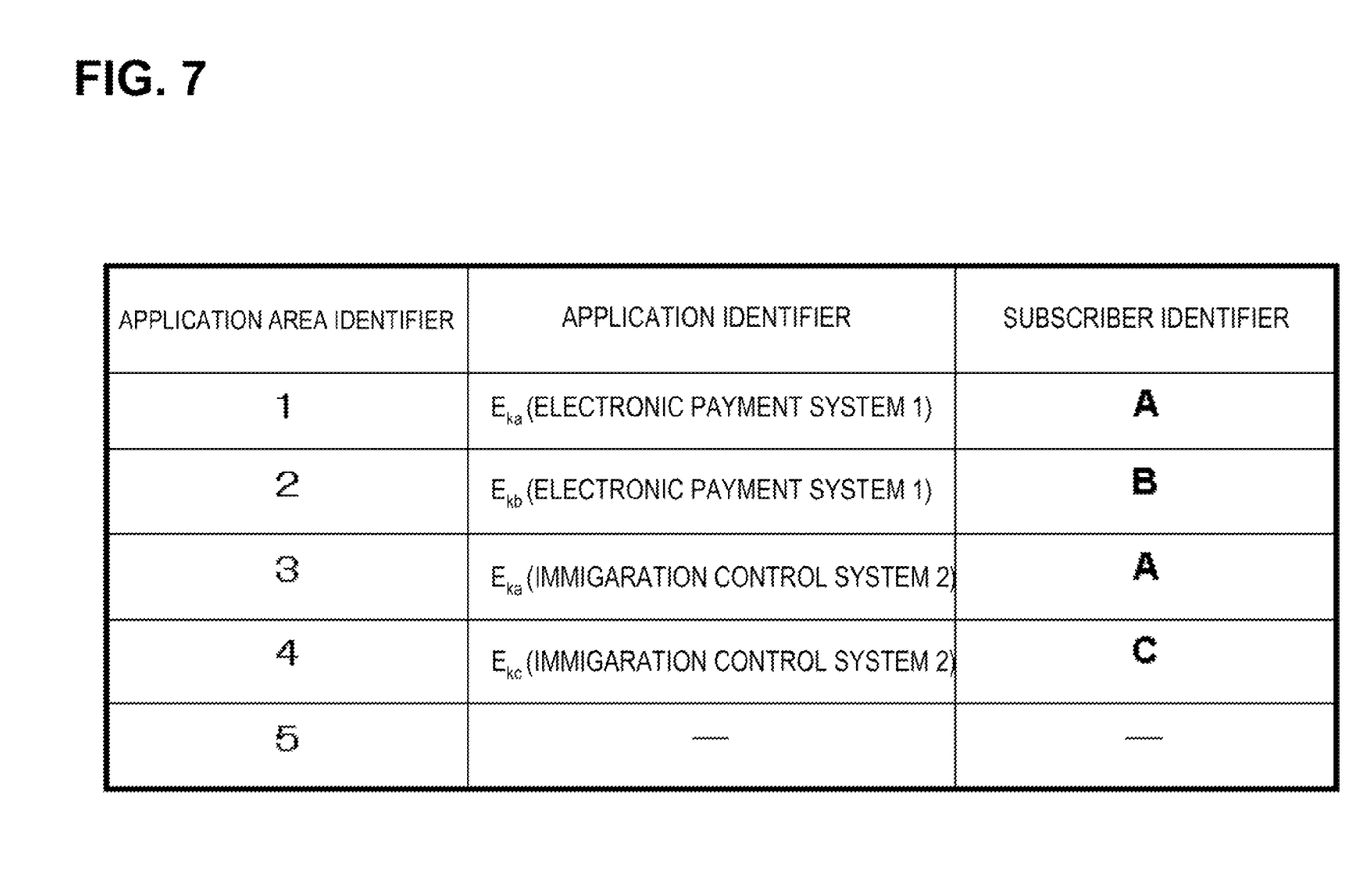
FIG. 7 is a drawing for describing a configuration of an application area information DB of the portable terminal according to the second exemplary embodiment of the present invention.

An application area information DB 111, as exemplified in FIG. 7, stores a set (in the present exemplary embodiment, this set is referred to as "application area information") of a subscriber identifier and an application identifier encrypted by encryption keys $E_{k_a}$-$E_{k_c}$ stored in each user's USIM 3 and an application area identifier.

An application area control unit 112 obtains the subscriber identifier and the encryption key from the USIM 3. The application area control unit 112 obtains the set of the application area identifier and the encrypted application identifier and subscriber identifier from the application area information DB 111, passes the encryption key to the encryption-decryption unit 114, and requests decryption of an application identifier matching the obtained subscriber identifier. The application area control unit 112 transmits the abovementioned decrypted application identifier and the application area identifier to a contactless IC chip 2, and requests updating of the application identifier in the contactless IC chip 2.

An application area information recording unit 113, in a case where an application identifier is inputted from an input unit 4, obtains a subscriber identifier and an encryption key from the USIM 3, passes the encryption key to the encryption-decryption unit 114, and requests encryption of the application identifier. The application area information recording unit 113, similar to the application area control unit 112, obtains the set of the application area identifier and the encrypted application identifier and subscriber identifier from the application area information DB 111, passes the encryption key to the encryption-decryption unit 114, and requests decryption of an application identifier matching the obtained subscriber identifier. The application area information recording unit 113 transmits the abovementioned decrypted application identifier and the application area identifier to the contactless IC chip 2, and requests updating of the application identifier in the contactless IC chip 2.

The encryption-decryption unit 114, in accordance with an encryption or a decryption request from the application area control unit 112 or the application area information recording unit 113, returns this result to the origin of the request.

Continuing, a detailed description is given concerning operation of the portable terminal 1 according to the present exemplary embodiment, making reference to the drawings. First, a description is given concerning operation of each part when a user uses an application that utilizes an application area, making reference to FIG. 8.

Figure 8:
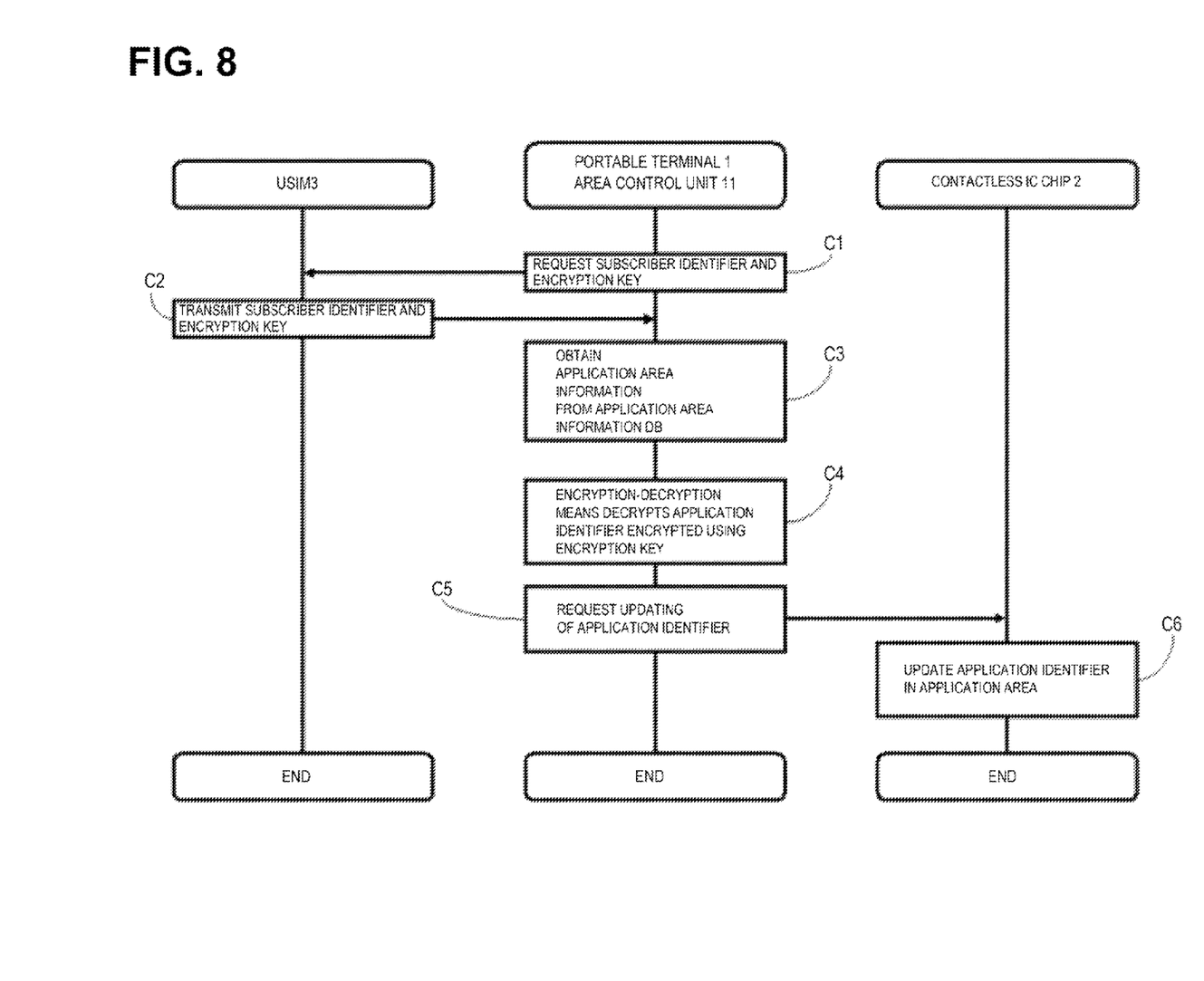
FIG. 8 is a flow diagram showing operations when a user uses an application utilizing an application area, in the portable terminal according to the second exemplary embodiment of the present invention.

When replacement of the USIM 3 is performed, the area control unit 11 of the portable terminal 1 requests a subscriber identifier and an encryption key of the USIM 3 (step C1).

Next, the USIM 3 transmits a subscriber identifier stored in the subscriber identifier storage unit 31 and the encryption key stored in the encryption key storage unit 32 to the area control unit 11 (step C2).

The area control unit 11 that receives the subscriber identifier and the encryption key obtains application area information in which the application identifier is encrypted by each user's encryption key shown in FIG. 7 (step C3).

Next, the area control unit 11 uses the encryption key obtained from the USIM 3, in the encryption-decryption unit 114, to decrypt an application identifier matching the subscriber identifier obtained from the USIM 3 (step C4).

Furthermore, the area control unit 11 transmits to the contactless IC chip 2 the application area identifier and the decrypted application identifier, and requests updating of the application identifier of the application area of the contactless IC chip 2 (step C5). At this time, the area control unit 11 writes the application identifier to the application area indicated, with regard to the contactless IC chip 2, and also makes a request that other application identifiers be made invalid.

The contactless IC chip 2 that receives the update request writes the application identifier that has been received to the application area corresponding to the received application area identifier, and also makes invalid other application areas (step C6).

From the above result, the application identifier that has been decrypted using the encryption key corresponding to identification information read from the USIM 3 is written to the application area indicated using identification information read from the USIM 3, and other application areas are made invalid. Therefore, a state is realized in which each user, who can be switched according to the USIM 3, can receive a service by the contactless IC chip, by using the respective user's own application area.

Figure 9:
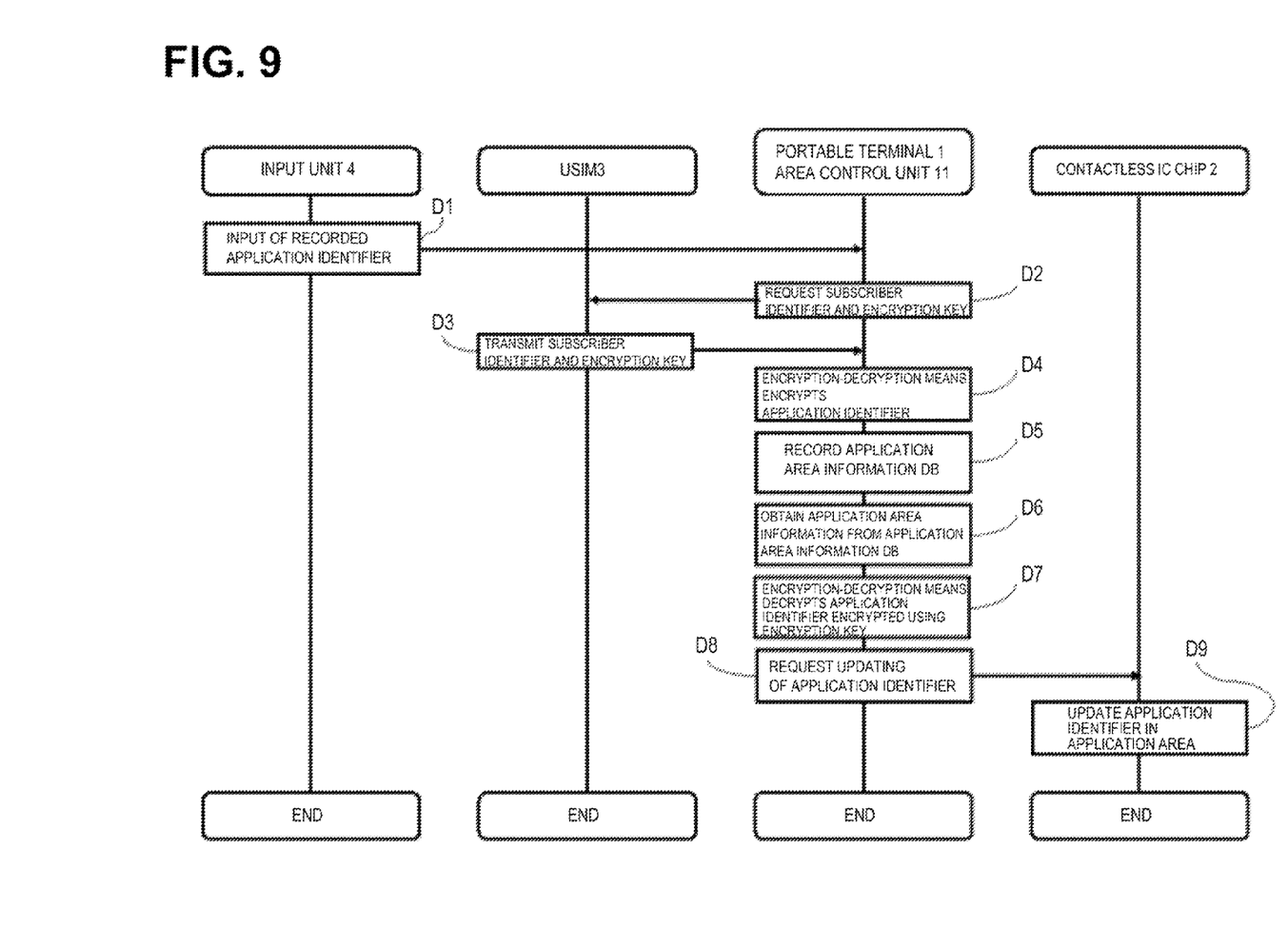
FIG. 9 is a flow diagram showing operations when a user newly uses an application, in the portable terminal according to the second exemplary embodiment of the present invention.

Next, a description is given concerning operation of each part when a user uses a new application, making reference to FIG. 9.

First, input of an application identifier recorded in the area control unit 11 of the portable terminal 1 is performed via the input unit 4 by a user (step D1).

The area control unit 11 of the portable terminal 1 requests a subscriber identifier and the encryption key, with respect to the USIM 3 (step D2).

Next, the USIM 3 transmits a subscriber identifier stored in the subscriber identifier storage unit 31 and the encryption key stored in the encryption key storage unit 32 to the area control unit 11 (step D3).

The area control unit 11 that receives the subscriber identifier and the encryption key uses the obtained encryption key to encrypt the inputted application identifier, by the encryption-decryption unit 114 (step D4).

Next, the area control unit 11 records new application area information holding a received subscriber identifier and an encrypted application identifier, as exemplified in FIG. 7, in the application area information DB 111 (step D5).

In addition, the area control unit 11 obtains application area information in which the application identifier is encrypted by each user's encryption key shown in FIG. 7, from the application area information D13 111 (step D6).

Continuing, the area control unit 11 uses the encryption key obtained from the USIM 3, in the encryption-decryption unit 114, to decrypt an application identifier matching the subscriber identifier obtained from the USIM 3 (step D7).

Furthermore, the area control unit 11 transmits to the contactless IC chip 2 the application area identifier and the decrypted application identifier, and requests updating of the application identifier of the application area of the contactless IC chip 2 (step D8). At this time, the area control unit 11 writes the application identifier to the application area indicated, with regard to the contactless IC chip 2, and also makes a request that other application identifiers be made invalid.

The contactless IC chip 2 that receives the update request writes the application identifier that has been received to the application area corresponding to the received application area identifier, and also makes invalid other application areas (step D9):

From the above result, the application identifier that has been decrypted by the encryption key corresponding to the application area specified using the identifier information, is written from the USIM 3, and other application areas are made invalid. Therefore, a state is realized in which each user, who can be switched according to the USIM 3, can receive a service by the contactless IC chip, by using the respective user's own application area.

Furthermore in the present exemplary embodiment, since the application identifier is encrypted, it is possible to make confidential, content of the application area information DB 111. That is, since it is not possible to judge what application another user is using in which application area without the encryption key stored in the USIM 3 possessed, it is possible to make confidential, other user's application usage history in a case where the contactless IC chip is shared by a plurality of users.

Descriptions have been given above according to preferred exemplary embodiments of the present invention, but the present invention is not limited to the abovementioned exemplary embodiments, and further modifications, substitutions, and adjustments within bounds that do not depart from a fundamental technological concept of the present invention can be added.

For example, in the abovementioned exemplary embodiments a description has been given in which the application area information recording unit 113 obtains the application area information and requests updating of the application identifier, with respect to the contactless IC chip 2, but various types of modification are possible in configurations of the area control unit 11, such as making these processes execute in the application area control unit that receives the request from the application area information recording unit 113.

Furthermore, in the abovementioned exemplary embodiments a description has been given in which updating of the application area information DB 111 and the application area information is performed with replacement of the USIM 3 as a trigger, but it is also possible to perform updating of the application area information DB 111 and the application area information in a case where a specific user switching operation is performed.

Industrial Applicability

According to the present invention, there is provided a portable terminal in which a storage medium such as a USIM or the like is used, to be shared by a plurality of users, and furthermore a contactless IC chip can be shared by a plurality of users.

The various disclosures of the above described patent documents are incorporated in the present document by reference thereto. Modifications and adjustments of embodiments and examples are possible within the bounds of the entire disclosure (including the scope of the claims) of the present invention, and also based on fundamental technological concepts thereof. Furthermore, a wide variety of combinations and selections of various disclosed elements are possible within the scope of the claims of the present invention. That is, the present invention clearly includes every type of transformation and modification that a person skilled in the art can realize according to technological concepts and the entire disclosure including the scope of the claims.

What is claimed is:

1. A portable terminal comprising:
    an IC chip having a contactless communication function enabling use of a plurality of services;
    an application area information storage unit that stores application area information for associating users, application identifiers for identifying applications corresponding to services to be used, and plural application areas provided in an IC chip; and
    an application area control unit that puts into a useable state an application area of a user corresponding to said identification information in said IC chip, based on said application area information and identification information read from a replaceable storage medium storing identification information for identifying users.

2. The portable terminal according to claim 1, further comprising an application area information recording unit that generates a new entry in said application area information storage unit, in a case where an application identifier is inputted from outside.

3. The portable terminal according to claim 1, wherein said application area control unit records usability information indicating usability by a user specified by said identification information, in said application area.

4. The portable terminal according to claim 1, wherein said application area control unit records the application identifier in question in an application area associated with said identification information, and makes invalid an application identifier of an application area associated with another user.

5. The portable terminal according to claim 3, wherein said application area control unit performs a writing operation to said application area, in a case where said storage medium is replaced.

6. The portable terminal according to claim 1, further comprising an encryption-decryption unit that encrypts an application identifier recorded in said application area information storage unit, or decrypts an application identifier that has been encrypted and recorded in an application area information storage unit.

7. The portable terminal according to claim 6, wherein a process of said encryption-decryption is performed using an encryption key stored in said replaceable storage medium.

8. The portable terminal according to claim 1, wherein said replaceable storage medium is a Universal Subscriber Identity Module USIM, and a subscriber identifier recorded in a USIM is used as said identification information.

9. An application area control method of performing control of usage of a plurality of application areas provided in an IC chip of a portable terminal in which said IC chip, having a contactless communication function, is mounted, and which enables services using said contactless communication function, wherein said application area control method comprises:

storing application area information associating users, application identifiers for identifying applications corresponding to services to be used, and plural application areas provided in an IC chip, in an application area information storage unit provided in a portable terminal; and     in a case where a storage medium that stores identification information for identifying users is replaced, putting into a usable state an application area of a user corresponding to said identification information in said IC chip, based on said application area information and identification information read from said storage medium.

10. An application area control program that performs control of usage of a plurality of application areas provided in an IC chip of a portable terminal in which said IC chip, having a contactless communication function, is mounted, and which enables services using said contactless communication function, wherein said application area control program executes on a computer installed in said portable terminal:

a process, in a case where an application identifier is inputted from outside, of storing application area information for associating users, application identifiers for identifying applications corresponding to services to be used, and plural application areas provided in an IC chip, in an application area information storage unit provided in a portable terminal; and     a process, in a case where a storage medium that stores identification information for identifying users is replaced, of putting into a usable state an application area of a user corresponding to said identification information in said IC chip, based on said application area information and identification information read from said storage medium.

* * * * *